United States Patent [19]

Larsen

[11] Patent Number: 4,794,415

[45] Date of Patent: Dec. 27, 1988

[54] DEVELOPING TRAY

[75] Inventor: Rex S. Larsen, Rodovre, Denmark

[73] Assignee: Eskofot A/S, Ballerup, Denmark

[21] Appl. No.: 39,733

[22] Filed: Apr. 20, 1987

[30] Foreign Application Priority Data

Apr. 28, 1986 [DK] Denmark ............................ 1940/86

[51] Int. Cl.[4] ............................................. G03B 3/08

[52] U.S. Cl. ..................................... 354/302; 354/320

[58] Field of Search ............... 354/301, 302, 305, 320, 354/321, 322, 338, 339

[56] References Cited

U.S. PATENT DOCUMENTS

| | | | |
|---|---|---|---|
| 2,664,801 | 1/1954 | Eisbein | 354/301 |
| 2,793,574 | 5/1957 | Unterberger | 354/301 |
| 3,136,238 | 6/1964 | Corona | 354/302 |
| 3,171,341 | 3/1965 | Gordon | 354/302 |
| 3,616,741 | 11/1971 | Simioni et al. | 354/302 |
| 3,621,773 | 11/1971 | Limberger et al. | 354/338 |

FOREIGN PATENT DOCUMENTS

| | | | |
|---|---|---|---|
| 611464 | 10/1960 | Italy | 354/302 |
| 269032 | 6/1964 | Netherlands | 354/305 |

*Primary Examiner*—A. A. Mathews
*Attorney, Agent, or Firm*—Cushman, Darby & Cushman

[57] ABSTRACT

A developing tray for feeding a sheet of positive material and a sheet of negative material through a bath of developer, above which bath a lid is mounted for reducing the evaporation of developer, feed rollers being provided at both the input opening and the output opening, and whereby the bottom of the tray is provided with ribs extending substantially in the feed direction of the sheets. The length of the developing tray is primarily determined by the fact that a predetermined developing time is necessary. Furthermore the material in question must be fed through the bath at a predetermined speed in order to ensure a predetermined turbulence in the developer. The bath must therefore be of a certain minimum length. A problem is therefore caused by small sheets unable to reach the rollers at the output opening. The same developing tray also can be used in connection with light sensitive materials of a small size, e.g. A5-size, by providing extra openings in the lid, spaced from the rollers at the output opening in such a manner that the sheets of light sensitive material can reach these rollers.

1 Claim, 3 Drawing Sheets

DEVELOPING TRAY

FIELD OF THE INVENTION

The invention relates to a developing tray for feeding a sheet of positive material and a sheet of negative material through a bath of developer, above which bath a lid is mounted for minimizing the evaporation of developer, feed rollers being provided at the input opening and at the output opening, and whereby the bottom of the tray is provided with ribs extending substantially in the feed direction of the sheets.

Such a developing tray can be used in connection with predetermined sizes as the sheets must be able to reach from one set of rollers to the other.

SUMMARY OF THE INVENTION

According to the invention, the lid is provided with extra openings.

In this way the developing tray is suitable for small sizes as the distance between the extra feed openings and the rollers at the output opening is small.

Special control means can optionally be provided at the extra openings.

BRIEF DESCRIPTION OF THE DRAWING

The invention is more closely explained in the following with reference to the accompanying drawing, in which.

DESCRIPTION OF THE PREFERRED EMBODIMENTS

Figure 1:
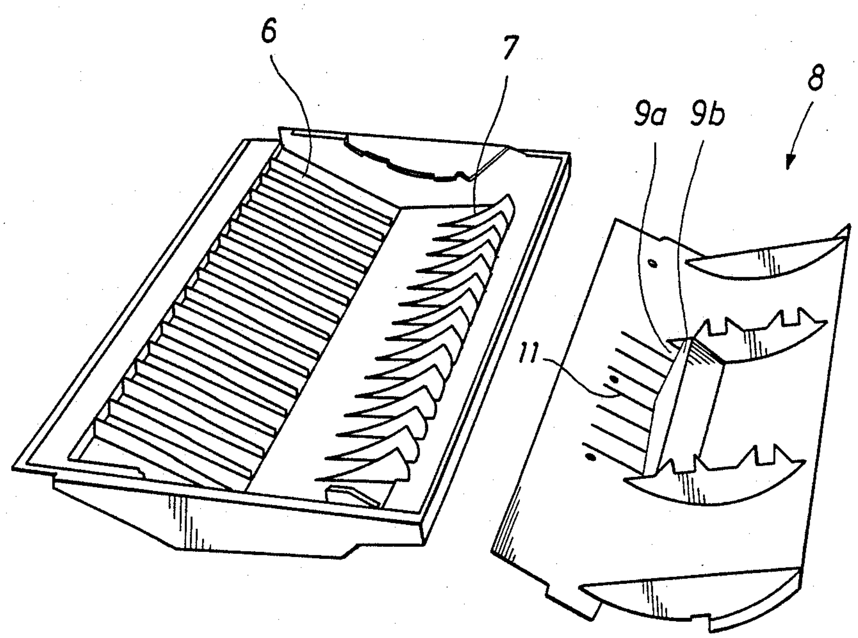
FIG. 1 illustrates a developing tray with an associated lid.

The developing tray shown in FIG. 1 allows feeding of a sheet of positive material and a sheet of negative material through a bath of developer. Over the bath a lid 8 is mounted which reduces evaporation and oxidation of the developer. Furthermore feed rollers 1, 2, 3, 4 are provided both at the input opening as well as at the output opening—cf. FIG. 2—, said rollers being motor-driven for achieving a uniform feeding speed through the developer. Ribs 6, 7 at the bottom of the tray ensure that the sheets with photographic material do not adhere to the bottom.

The length of the developing tray is primarily determined by the fact that a predetermined developing time is necessary. Furthermore the material in question must be fed through the bath at a predetermined speed in order to ensure a predetermined turbulence in the developer. A problem is therefore caused by small sheets unable to reach the rollers at the output opening.

Figure 3:
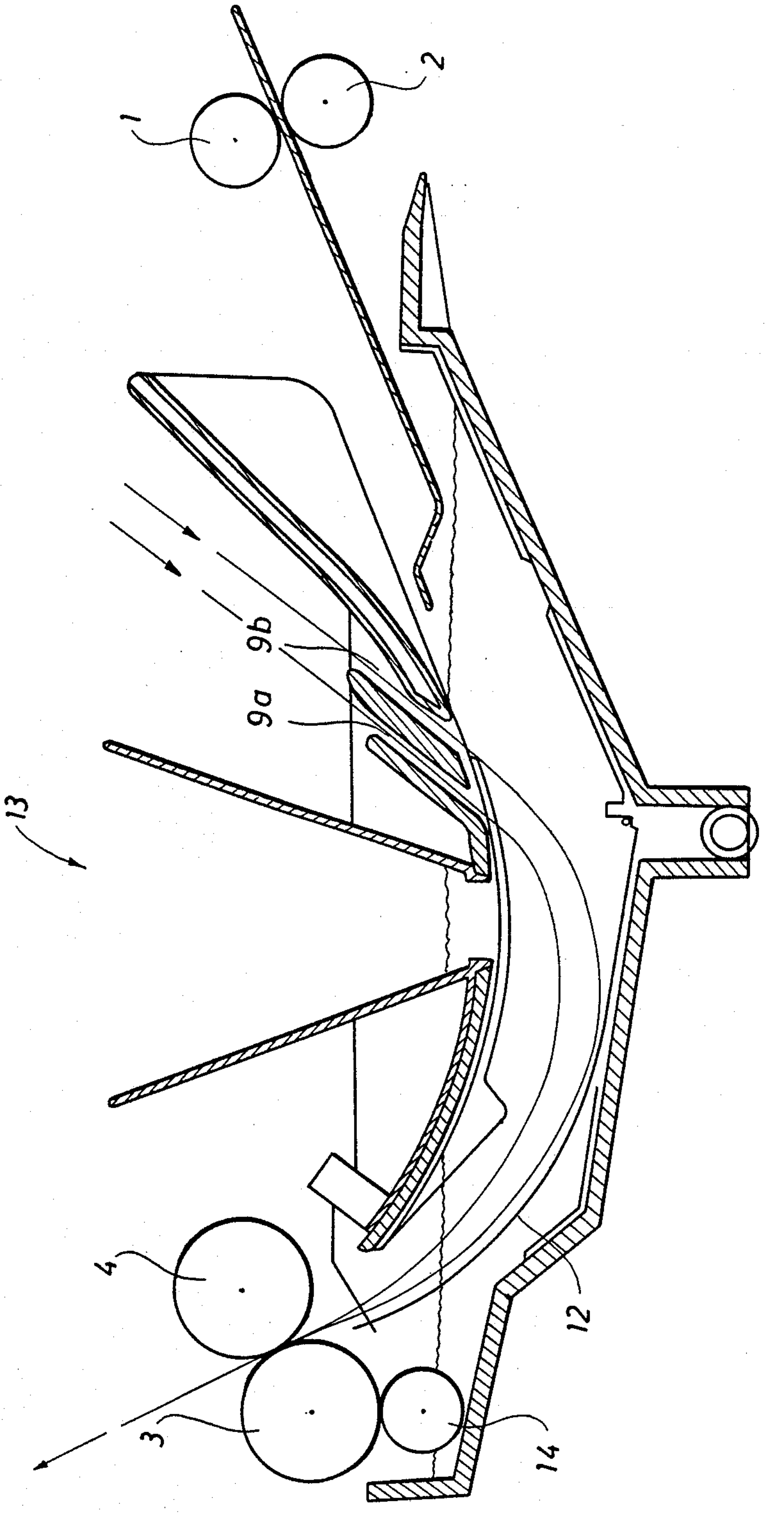
FIG. 3 is a sectional view through the developing tray with the lid mounted, a small sheet being fed therein.

According to the invention it has been demonstrated how the same developing tray also can be used in connection with light sensitive materials of a small size, e.g. A5-size and this object is according to the invention achieved by providing extra openings 9*a*, 9*b*—cf. FIG. 3—in the lid 8, spaced from the rollers 3, 4 at the output opening in such a manner that the sheets of light sensitive material can just reach these rollers. Special control means, eg. in the form of projections can be provided in connection with these extra openings 9*a*, 9*b* for ensuring a correct joining of the sheets. At these openings 9*a*, 9*b*, the feeding is performed manually.

Also in connection with the extra openings 9*a*, 9*b*, ribs 11 may be provided for ensuring that the sheets do not adhere to the lid 8.

Figure 2:
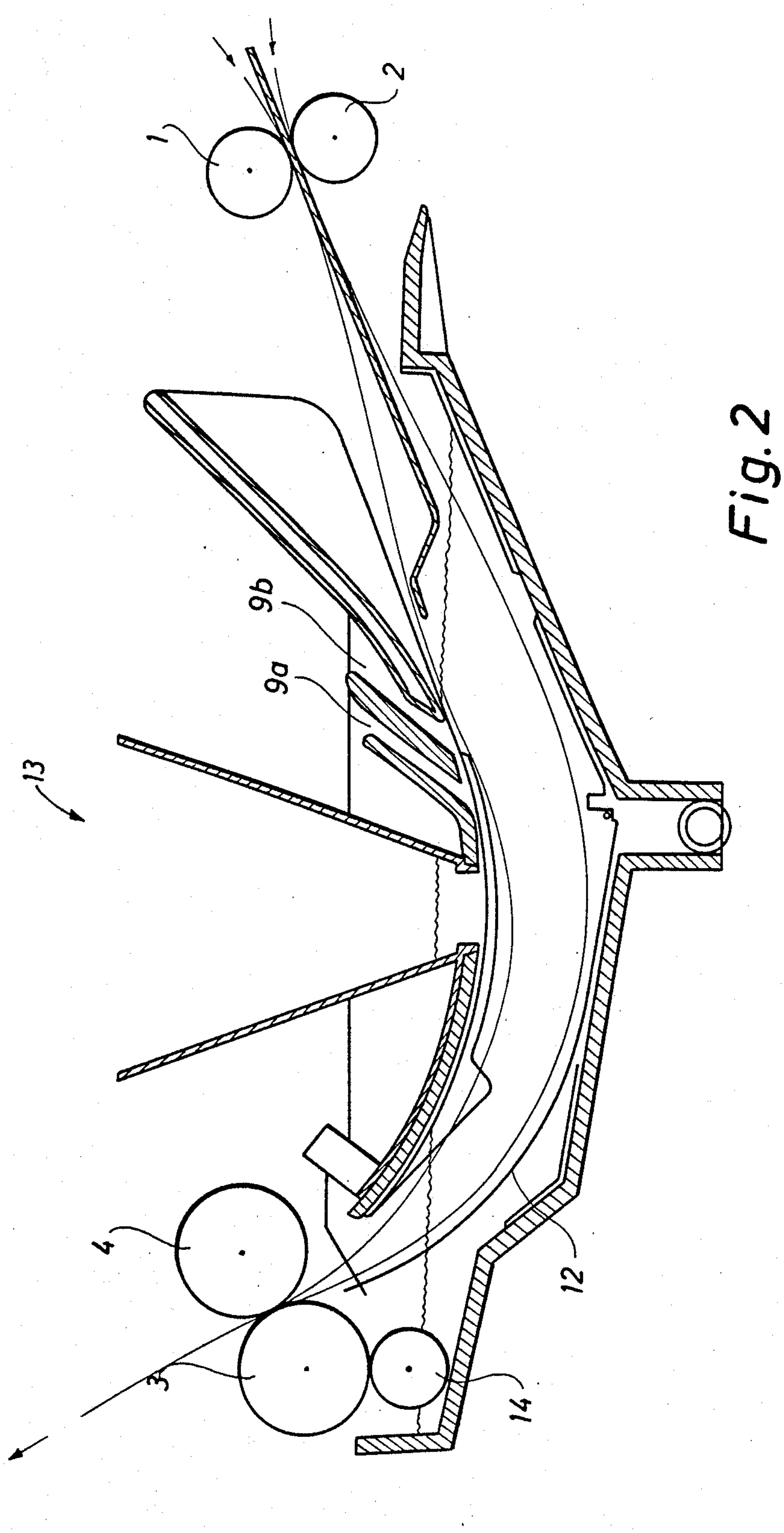
FIG. 2 is a sectional view through the developing tray with the lid mounted.

As shown in FIGS. 2 and 3, the bottom of the tray may be provided with an extra bottom member 12 granulated on the surface and preferably made of stainless steel.

The diffusion process starts after the materials have been squeezed together by the output rollers 3, 4.

At the output opening, an additional roller 14 is optionally provided, said roller being partly immersed in the developer. This additional roller is connected to and wets the discharge rollers 3, 4. The evaporation from the discharge rollers 3, 4 and the wetting roller 14 thereby provides a substantially constant temperature of the bath.

The developing tray is built into a box, a special lid being provided for the additional openings for other sizes. The developing tray is preferably made of plastics.

The developing tray can be modified in many ways without thereby departing from the idea of the invention.

The length of the bath is preferably 180 mm.

I claim:

1. A developing tray for feeding a sheet of positive material and a sheet of negative material through a bath of developer, comprising:

an upwardly open tray body for containing a bath of developer;

a lid superimposed on said tray body for reducing evaporation of developer from said bath;

longitudinal rib means integrally provided on said tray body and lid within said tray for preventing internal sticking of said sheets of positive and negative material to walls of said tray;

first edge means of said tray body and lid defining between them an input opening into said tray;

second edge means of said tray body and lid defining between them an output opening from said tray;

said input opening and said output opening being longitudinally spaced from one another along means defining a first feeding path for sheets in said tray;

a first set of feed rollers including at least two opposed feed rollers separated by divider means, said first set of feed rollers being juxtaposed with said input opening and said at least two opposed feed rollers thereof being power operable for simultaneously feeding into said tray and along said first feeding path a sheet of positive material and a sheet of negative material separated from one another by said divider means;

a second set of feed rollers including at least two opposed feed rollers, said second set of feed rollers being juxtaposed with said output opening and said at least two opposed feed rollers of said second set thereof being power operable for simultaneously feeding along said first feeding path and out of said tray said sheet of positive material and said sheet of negative material while squeezing said sheet of positive material and said sheet of negative material together after said sheets have emerged from the bath contained in said tray body;

said first set of feed rollers and said second set of feed rollers being longitudinally spaced from one another along said first feeding path by a first distance;

said lid further including transverse slot means defining two longitudinally adjacent manual feed openings therethrough separated by projection means;

said manual feed openings and said output opening being longitudinally spaced from one another along means defining a second feeding path which merges with said first feeding path between said manual feeding openings and said second set of feed rollers;

said manual feed openings and said second set of feed rollers being longitudinally spaced along said second path by a second distance, which is shorter than said first distance, whereby a sheet of positive material and a sheet of negative material which are too short to reach from said first set of feed rollers to said second set of feed rollers along said first feeding path but are long enough to reach from said manual feed openings to said second set of feed rollers along said second path can be simultaneously manually fed into said tray respectively separated by said projection means, along said second feeding path, and out of said tray through said output opening while being squeezed together by said two power operable opposed feed rollers of said second set after emerging from the bath contained in said tray body.

* * * * *